June 16, 1959  A. M. KING  2,890,643
BEVERAGE BREWING AND DISPENSING APPARATUS
Filed July 7, 1954  5 Sheets-Sheet 1
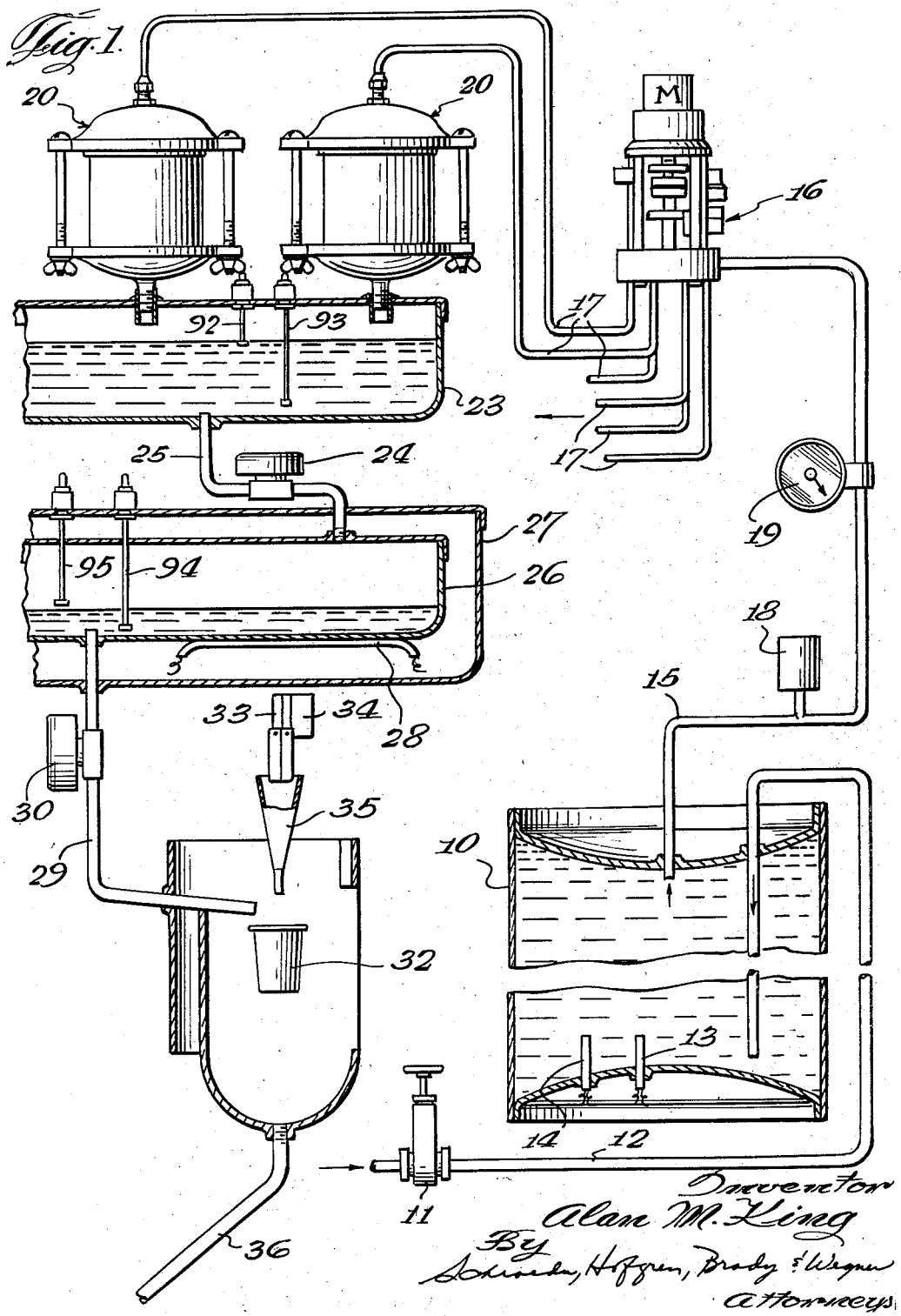

June 16, 1959 A. M. KING 2,890,643
BEVERAGE BREWING AND DISPENSING APPARATUS
Filed July 7, 1954 5 Sheets-Sheet 2
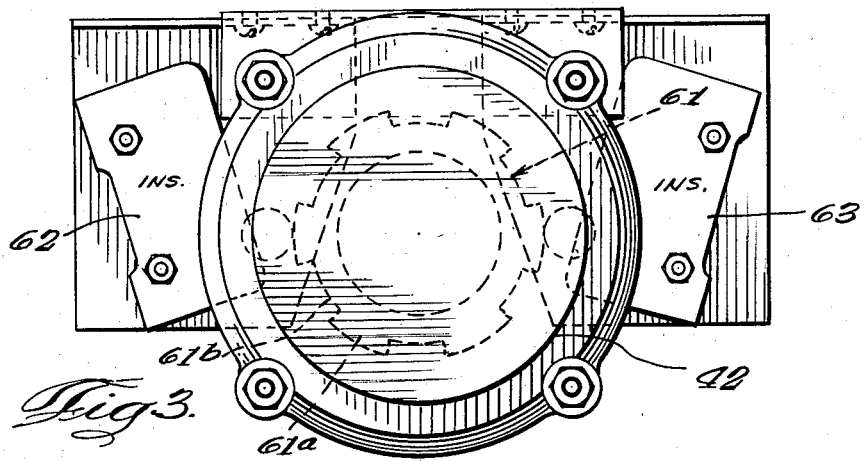
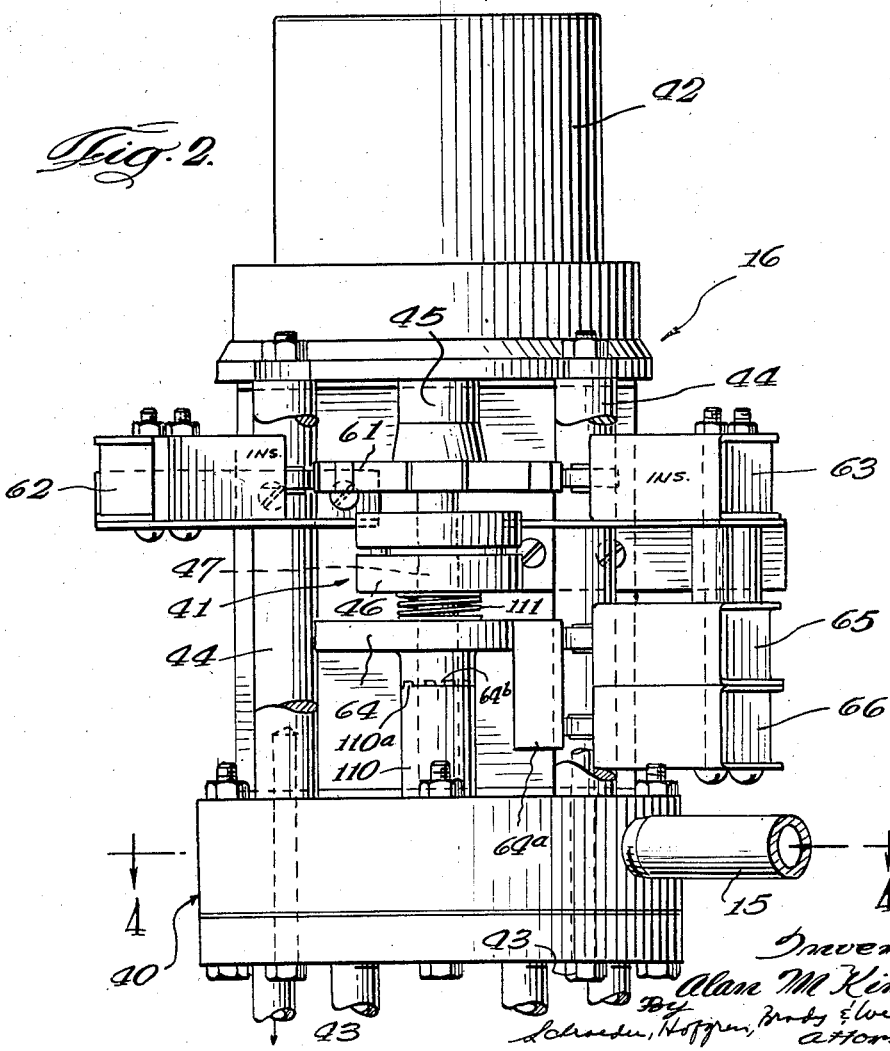

June 16, 1959  A. M. KING  2,890,643
BEVERAGE BREWING AND DISPENSING APPARATUS
Filed July 7, 1954  5 Sheets-Sheet 3

Inventor
Alan M. King
By Schroeder, Hoffgren, Brady & Wegner
Attorneys

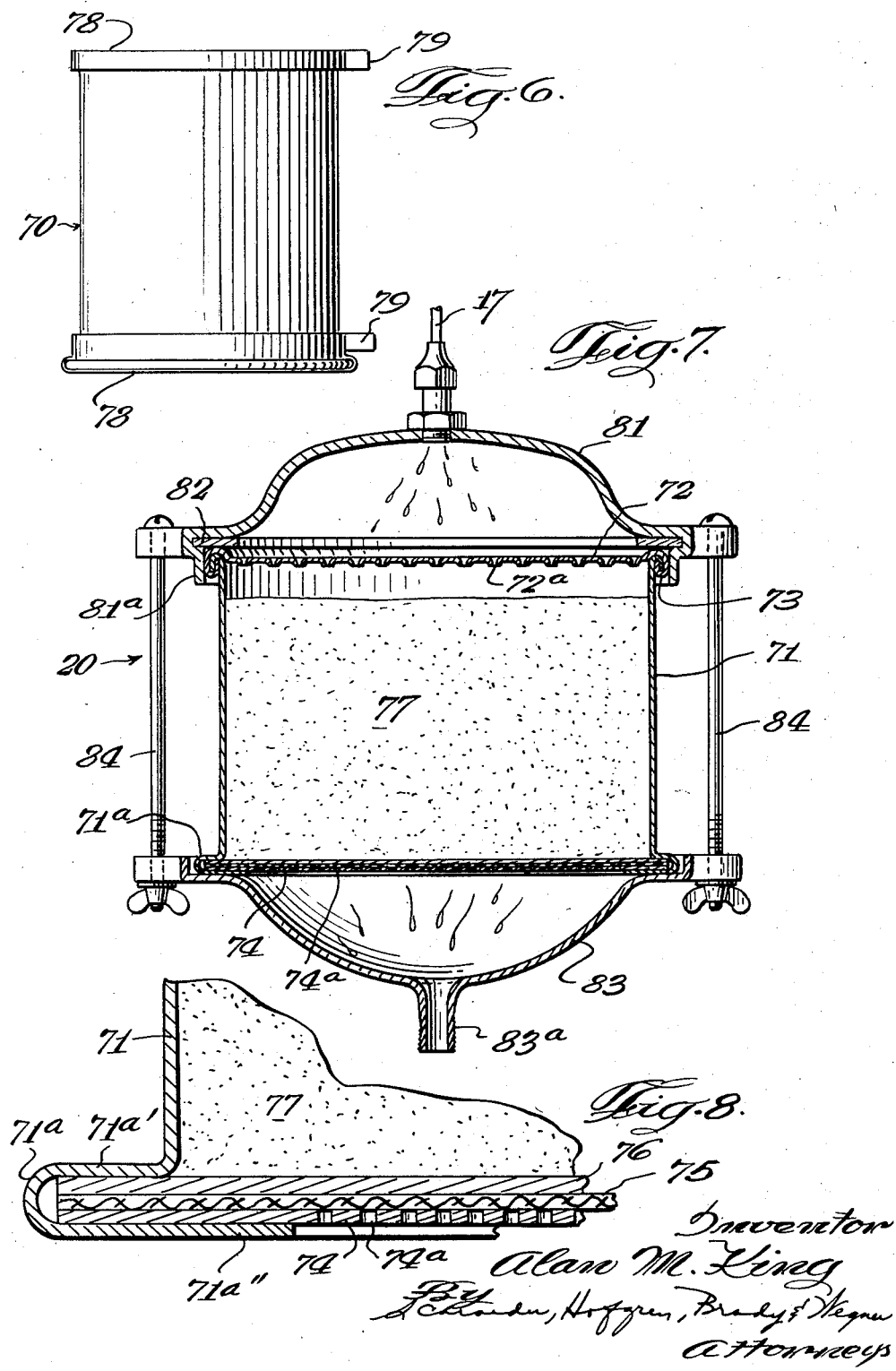

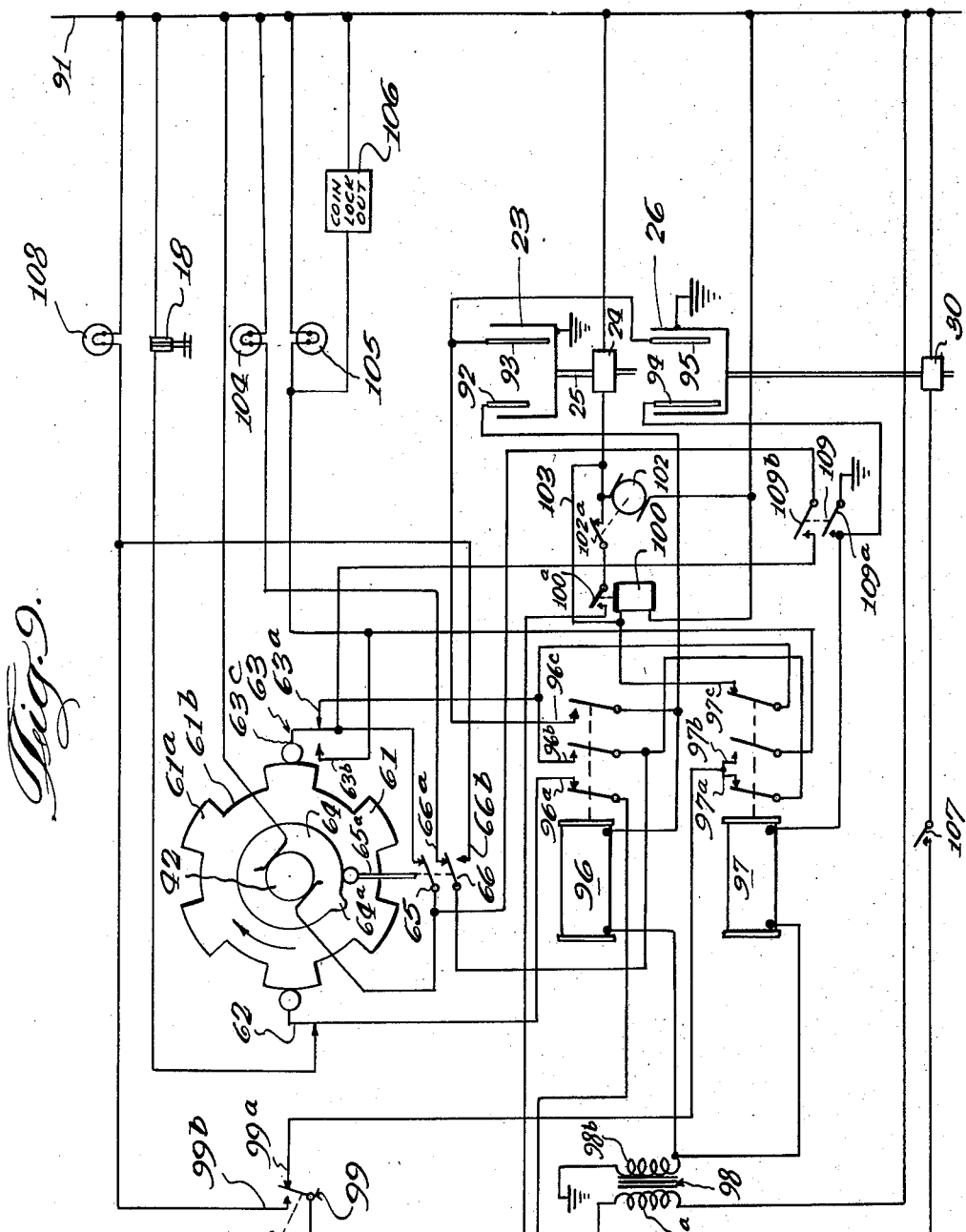

United States Patent Office 2,890,643
Patented June 16, 1959

2,890,643

BEVERAGE BREWING AND DISPENSING APPARATUS

Alan M. King, Montreal, Quebec, Canada, assignor to United Coffee Corp., a corporation of Illinois Application July 7, 1954, Serial No. 441,855

5 Claims. (Cl. 99—283)

This invention is concerned with a beverage brewing and dispensing apparatus and more particularly with a novel fluid distribution valve, brewing container and control system for use in such an apparatus.

One feature of this invention is that it provides a beverage preparing system comprising a source of a liquid ingredient for a beverage, a plurality of beverage preparing units, a distribution valve having a plurality of ports therein, one connected to the source of liquid and different ones connected to each of the beverage preparing units, means normally closing at least part of the ports and means for selectively opening the closed ports to permit the flow of water to desired beverage preparing units.

Another feature is the provision of a fluid distribution valve comprising housing means having a plurality of ports therein, means normally closing at least a portion of the ports and means for selectively opening the closed ports. And a feature is that the distribution valve comprises a housing including a base member having a plurality of ports therein, a plurality of closure members associated with each of the ports and movable between open and closed position, means normally maintaining said closure members in one of said positions and means for selectively moving certain of said closure members to other of said positions.

A further feature is the provision of a disposable brewing device for use in a beverage preparing and dispensing machine having liquid supply means and a beverage tank, including a hermetically sealed container having therein a quantity of material for the preparation of the desired beverage when said liquid is passed through the container, said container having spaced portions adapted to provide separate openings when the container is placed in operative position in the machine for connection respectively to the liquid supply means and the beverage tank. Still another feature is the provision of a disposable brewing container comprising a sheet metal receptacle having top and side wall portions, the bottom being open and having perforations in said top portion, a perforate bottom closure member, filter means positioned on top of and supported by said bottom closure member, the bottom closure member and filter means being sealingly engaged by part of said side wall portion, the receptacle being adapted to contain a quantity of material for the preparation of an infusion. And a feature is that the brewing container has sealing means covering the top portion and bottom member for keeping the material contained therein fresh prior to use, the sealing means being readily severable to permit introduction into said housing of a liquid for the preparation of a beverage.

Yet a further feature is the provision, in a beverage brewing apparatus having a source of brewing liquid and means for utilizing brewed beverage, of a disposable brewing container such as described above, together with means connected to the source of brewing liquid and adapted for readily separable engagement with the container for delivering liquid thereto, means connected to the beverage utilizing means and adapted to receive brewed beverage from the container and means for securing the container and both of said last mentioned means together in operable relationship.

And another feature is the provision of a fluid distribution valve and control assembly comprising valve means having an inlet, a plurality of outlets and means for effecting communication between the inlet and a desired one of the outlets, electrical operating means for the valve means, switch means associated with the valve means and operable as a function thereof and means for energizing the electrical operating means and including the switch means whereby proper positioning of the valve means is automatically effected.

Further features and advantages will readily be apparent from the following specification and from the drawings, in which:

Figure 1 is a diagrammatic flow sheet illustrating a beverage brewing and dispensing apparatus embodying the invention;

Figure 2 is an elevation view of the fluid distribution valve and control assembly;

Figure 3 is a top plan view of the distribution valve and control assembly of Figure 2;

Figure 6 is an elevation view of a disposable brewing container;

Figure 7 is a vertical sectional view of the brewing container and its associated apparatus;

Figure 8 is a fragmentary section of a portion of the brewing container; and

Figure 9 is a schematic diagram of the control circuit for the brewing and dispensing apparatus.

Figure 4:
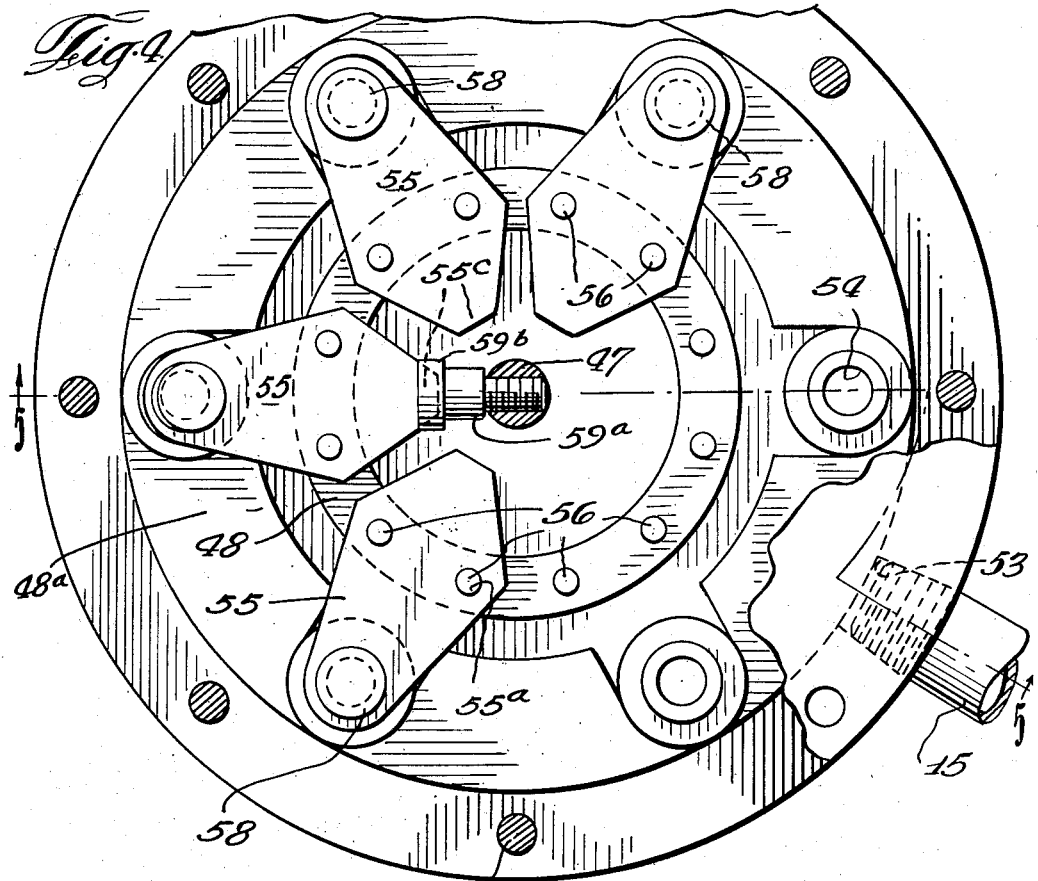
Figure 4 is a horizontal section taken along line 4—4 of Figure 2.

The diagrammatic flow sheet shown in Figure 1 illustrates a portion of the mechanical apparatus of a beverage brewing and dispensing system with which the invention is concerned. The system operates generally in the following manner.

A liquid, as water, for use in preparation of a beverage is introduced into heating tank 10 from a suitable source such as a city water main (not shown) through valve 11 and pipe line 12. The water within tank 10 is heated to a suitable temperature by an electric heating element 13 which may be controlled by a thermostatic switch 14. Heated water from tank 10 is conducted through outlet pipe 15 and distribution valve assembly indicated generally as 16 to individual brewing receptacle pipes 17 (six such pipes being shown herein although it should be understood that any desired number of brewing receptacles and pipes may be provided). The flow of water through outlet pipe 15 is controlled by an electrically operated main water valve 18; and a pressure indicator 19 is provided so that the pressure of the water may be adjusted, through manipulation of the valve 11, to the desired brewing pressure of about 5 pounds per square inch.

The distribution valve, which forms a portion of assembly 16, and which will be described more fully later, is arranged so that one of the brewing receptacle pipes is always in fluid communication with water heating tank outlet pipe 15 when the apparatus is in condition to prepare more beverage. Each of the brewing receptacle assemblies, indicated generally as 20, contains a quantity of beverage ingredient such as ground coffee, each receptacle holding a quantity sufficient for the brewing of a desired batch of coffee.

When beverage is to be brewed, valve 18 is opened and hot water flows through pipe line 15, distribution valve 16, and one of the receptacle pipes 17 to a brewing receptacle 20. Within the brewing receptacle the heated water percolates through the ground coffee forming an infusion which drains into measuring tank 23. After a predetermined quantity of coffee has been delivered to measuring tank 23, valve 18 is closed and the brewing process ends.

If conditions in the system are proper, as will appear later, electrically operated transfer valve 24 will be opened allowing the coffee in measuring tank 23 to flow through pipe line 25 to dispensing tank 26. As the coffee is generally retained within dispensing tank 26 for an appreciable period of time, the tank is enclosed within an outer chamber 27 and heating element 28 is provided to keep the coffee warm until it is dispensed.

Coffee is dispensed from tank 26 through pipe 29 when electrically operated dispensing valve 30 is opened, delivering the coffee to a suitable container such as cup 32 positioned below the end of pipe 29. The cup 32 may be supplied from any suitable cup dispensing apparatus (not shown), many types of which are well-known.

With beverages such as coffee it may often be desirable to provide for the addition of further ingredients such as cream and sugar. For this purpose cream and sugar receptacles 33 and 34, respectively, are positioned above cup 32 and may be operated to effect the discharge of a suitable quantity of the desired additional ingredients through funnel 35 and into cup 32 where they are mixed with the coffee from pipe 29. A drain pipe 36 is provided to carry away any spilled beverage.

Further details of the general mechanical arrangement of the entire system may be found in copending Arnett application, Serial No. 336,563, filed February 12, 1953, now Patent No. 2,761,200, issued September 4, 1956, and assigned to the assignee of this application.

A control system, which will be described fully later, is provided and controls the operation of the various elements of the system so that when the level of beverage in the storage tank 26 falls below a predetermined point, the brewing operation is initiated to provide a fresh supply of beverage. After each of the brewing receptacles provided have been used, the machine automatically shuts off to prevent reuse of exhausted coffee grounds.

Referring now to Figures 2–5, the distribution valve assembly indicated generally as 16 includes three major portions, the valve 40, a control assembly 41 and a valve drive motor 42. The motor 42 is mounted above the valve 40 and in spaced relation thereto by means of bolts 43 and spacer collars 44, four of each being used. The shaft 45 of the motor 42 extends downwardly therefrom and is connected through a flexible coupling 46 to shaft 47 which controls the operation of the valve.

Figure 5:
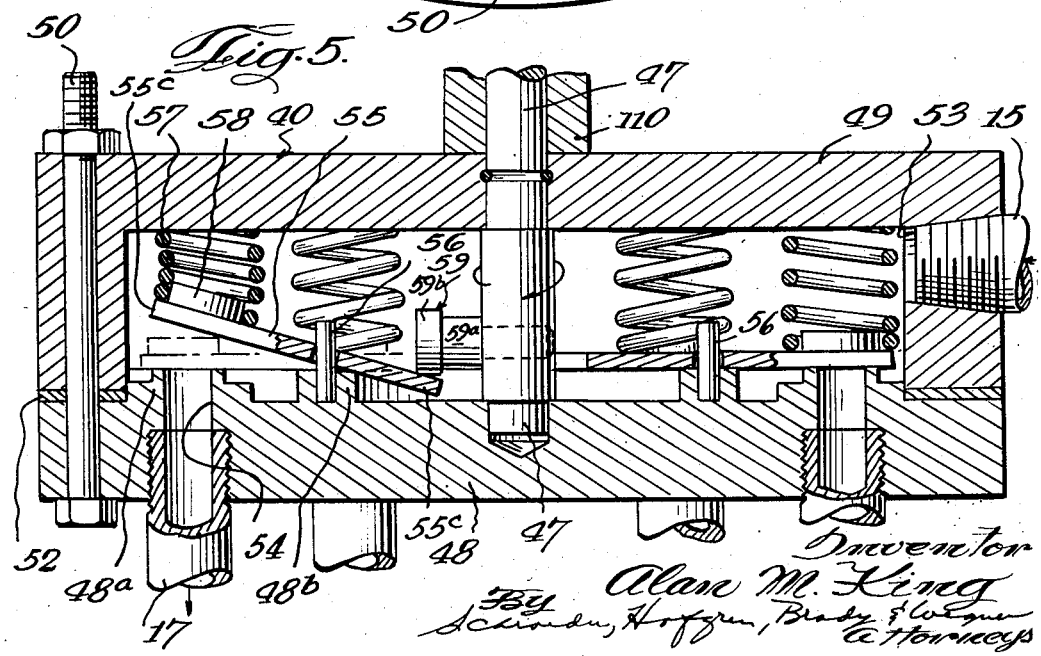
Figure 5 is a vertical section taken along line 5—5 of Figure 4.

As may be seen in Figures 4 and 5, distribution valve 40 includes a base plate 48 and a cover member 49 held together by bolts 50 with a resilient gasket 52 interposed therebetween to form a fluid-tight housing. An inlet 53 is provided in the wall of cover member 49 and has the hot water outlet pipe 15 secured thereto to deliver water to the distribution valve.

An annular raised portion 48a is provided around the outer periphery of the base plate 48, inside cover member 40. A plurality of outlet openings 54 are provided in the base plate 48 and extend through raised annular portion 48a. The outlet openings 54 are drilled and tapped for the attachment thereto of individual brewing receptacle pipes 17. A second annular raised portion or rib 48b is provided inside the annular portion 48a and intermediate portion 48a and centrally located shaft 47. A plurality of outlet port closure members 55, one for each outlet port, are pivotally carried on annular raised portion 48b and positioned thereon by pins 56 mounted in portion 48b and extending through openings 55a in the closure members, there being two pins for each closure member. An end portion 55b of each of the closure members extends over the adjacent outlet port 54 sealingly engaging the top surface of raised annular portion 48a to close the outlet port. The confronting surfaces of annular portion 48a and the valving portions 55b of closure members 55 are preferably lapped to insure a tight seal. Each of the closure members 55 is movable between closed and open position, as shown in Figure 5, and they are biased to closed position by means of coil springs 57 interposed between the upper surface of the closure members and the under surface of the valve housing cover member 49. A boss 58 is provided on the upper surface of each of the closure members 55 and is engaged by spring 57 to position the springs.

Each of the closure members 55 also has an operating portion 55c which extends inwardly of the annular raised portion 48b and is adapted to be engaged by valve closure operating member 59 carried on rotating shaft 47. Operating member 59 includes a stud 59a threaded into shaft 47 and carrying a roller member 59b at the outer end thereof the roller member extending over the operating portion 55c of the adjacent valve outlet closure member. As shaft 47 is rotated, closure operating member 59 successively engages the operating portion 55c of each of the closure members successively opening each of the associated outlet ports 54, one at a time.

The valve control portion 41 of assembly 16 includes a first cam 61 having six raised portions 61a and six depressed portions 61b and two diametrically opposed switches 62 and 63 which are associated therewith. In addition, an adjustable second cam 64 is provided which has two switches 65 and 66 associated therewith. The cams 61 and 64 are rotated by the motor 42 and through their operation of the various switches associated therewith, together with other elements of the electrical control circuit, control the operation of motor 42 to effect the desired opening and closing of the various valve outlet ports 54.

Referring now to Figures 6, 7 and 8, the brewing receptacle assembly 20 will be described in detail. The disposable brewing receptacle or container 70 is preferably of a sheet metal material and includes a side wall portion 71 and a top portion 72 secured thereto as by means of an interlocking crimp 73. The top portion 72 is provided with a plurality of small perforations 72a covering substantially the entire surface thereof. The open bottom of receptacle 71 is closed by a separate bottom member 74 which likewise is provided with a plurality of small openings 74a. A filter assembly, including filter cloth 75 and filter paper 76, is disposed on top of bottom plate 74 and is supported thereby. The lower edge of side wall 71 is formed to provide an outwardly extending flange portion 71a having a U-shaped cross section. Bottom plate 74 together with filter cloth 75 and filter paper 76 are sealingly engaged between the legs 71a' and 71a'' of the flange at the bottom of the side wall 71. A desired quantity of ground coffee 77 may be placed in receptacle 70.

The receptacle 70 is preferably hermetically sealed prior to its use by covering the perforated top portion 72 and bottom member 74 with readily removable plastic coverings 78 which are provided with tear-off strips 79 to facilitate removal.

It is contemplated that freshly charged, sealed brewing receptacles will be provided to the servicemen who maintain the dispensing apparatus. When a machine is serviced, used brewing receptacles may be removed and thrown away. At the same time the sealing covers 78 may be severed or removed from a fresh brewing receptacle by tearing away strip 79; and the fresh receptacle placed in the machine.

The brewing assembly 20 also includes a cover member or spray head 81 to which the brewing receptacle pipe 17 from distribution valve 16 is attached. Spray head 81 is provided with a depending flange 81a which is adapted to extend around the periphery of the top portion 71 of the brewing receptacle, the receptacle projecting into spray head 81 and sealingly engaging a resilient gasket 82 carried therewithin. A generally funnel shaped bottom head member 83 is adapted to engage the lower end of receptacle 71 to collect the infusion after it percolates through the ground coffee within the receptacle. A fitting 83a connects lower head 83 to the measuring tank 23. Bolts 84 are provided for securing head members 81 and 83 together with brewing receptacle 71 interposed therebetween.

When water is introduced into the brewing assembly through pipe 17 it flows through the inlet openings 72a in top portion 72 of the brewing receptacle and percolates downward through the ground coffee 77 under the action of the pressure of about 5 pounds per square inch maintained in the line. The filter paper 76 removes substantially all particles of the ground coffee bean from the resulting infusion, permitting the beverage to be held in the measuring or dispensing tanks for a substantial period of time without becoming bitter. The infusion passes through outlet openings 74a in bottom plate 74 and drains into measuring tank 23.

Turning now to the control circuit shown in Figure 9, the apparatus may be energized by connecting it to a suitable source of power such as 110 volts A.C. through lines 90 and 91.

It will be assumed preliminarily that both measuring tank 23 and dispensing tank 26 are empty and that each of the brewing assemblies, there being six such assemblies in the apparatus, are charged with fresh, ground coffee and are ready for operation.

Measuring tank 23 is provided with a pair of control electrodes 92 and 93 and dispensing tank 26 is provided with a similar pair of electrodes 94 and 95. These electrodes are connected in the circuits of relays 96 and 97 to control the operation thereof, a continuous circuit being formed from the electrodes to the tanks 23 and 26 when liquid in the tanks covers the ends of the electrodes. Relays 96 and 97 are energized from the secondary winding 98b of transformer 98, the primary winding 98a of which is connected directly between lines 90 and 91.

As it has been assumed that both measuring tank 23 and dispensing tank 26 are empty, both relays 96 and 97 will not be energized and the contacts associated therewith will be in positions shown in the drawings. Also distribution valve motor 42 and control shaft 47 of the distribution valve will be in such a position that one of the outlet closure members 55 of the distribution valve is held in open position. Cams 61 and 64 and switches 62, 63, 65 and 66 associated therewith will be in the positions shown in the drawing.

A circuit is completed from line 90 through contact 96a of relay 96, and switch 62 to energize electrically operated water valve 18 permitting hot water to flow from heating tank 10 through pipe line 15, distribution valve 40 and one of the brewing receptacle pipe lines 17 to a brewing assembly 20. Another circuit is completed through contact 97a of relay 97 and contact 66a of double throw switch 66 energizing "Machine Brewing" light 104. Transfer valve 24 is closed so that the freshly brewed beverage remains in measuring tank 23. Water will continue to flow until the level of the beverage in measuring tank 23 reaches the lower end of brewing stop electrode 92, which is so positioned that only a desired amount of water is provided to the brewing apparatus, at which time a circuit is completed through the electrode 92 energizing relay 96. When relay 96 is energized, contact 96a is open, breaking the circuit to main water valve 18 and allowing it to close and stopping the flow of water to the brewing assembly.

At the same time, contacts 96b and 96c are closed. The closing of contact 96b completes the circuit from line 90 through normally closed contact 99a of cup sold out switch 99, contact 97a of relay 97, contact 63a of switch 63 and switch 65 to energize distribution valve drive motor 42. Motor 42 will drive distribution valve control shaft 47 and cams 61 and 64 in a clockwise direction as indicated in the drawings until contact 63a of switch 63 is opened when the switch actuating arm 63c enters a depression 61b on cam 61, breaking the first motor energizing circuit. At this point, actuating member 59 for the outlet port closure members 55 is positioned between the operating portions of two of the closure members so that no outlet is opened.

At the same time, the closing of contact 96b completes an energizing circuit through contact 97c of relay 97 to energize transfer valve relay 100; this results in the closing of the contact 100a associated therewith, simultaneously starting timing motor 102 and opening transfer valve 24 which allows the beverage in measuring tank 23 to flow through pipe 25 into dispensing tank 26. A connection 103 is provided for maintaining relay 100 energized until timing motor 102 has completed its cycle (at least sufficient time to drain all the beverage from measuring tank 23) at which time it opens switch 102a associated therewith deenergizing both relay 100 and transfer valve 24.

Contact 96c which also is closed when relay 96 is energized connects electrode 93 in measuring tank 23 and electrode 95 in dispensing tank 26 in parallel with electrode 92. This connection serves to maintain relay 96 energized until the beverage in dispensing tank 26 again drops below the bottom of electrode 95.

Electrode 94 is positioned adjacent the bottom of dispensing tank 26 so that as soon as coffee enters the dispensing tank from the measuring tank the bottom of this electrode will be covered and relay 97 connected thereto will be energized. This action opens contacts 97a and 97c breaking the energizing circuits for machine brewing light 104 and the original energizing circuit for transfer valve relay 100.

At the same time, contact 97b closes completing a second energizing circuit for motor 42 through contact 63b of switch 63. Motor 42 will again turn in a clockwise direction until actuating arm 63c of switch 63 is lifted by raised portion 61a of cam 61 opening contact 63b and stopping motor 42 and again closing contact 63a. This will position outlet operating member 59 on the operating portion of the next outlet port closure member opening the next outlet port in readiness for another brewing operation. Since main water valve 18 is closed, no water will flow.

Contact 97b also completes a circuit energizing "Machine Operating" light 105 and coin lock out mechanism 106 which prevents customers from depositing coins when no beverage is available in dispensing tank 26.

The beverage in dispensing tank 26 may be delivered to cup 32 by closing dispensing switch 107 which connects dispensing valve 30 across the line. Suitable dispensing control circuits for effecting operation of switch 107 may be provided, but as they form no portion of this invention they are not shown in detail herein; again reference may be had to the aforementioned copending Arnett application for complete details of such circuits.

After a portion of the beverage in tank 26 has been dispensed therefrom, the level of the beverage will fall below the bottom of brewing start electrode 95, which is preferably so positioned that this occurs when twenty or twenty-five cups of beverage remain in the dispensing tank. As all the beverage has previously been drained from measuring tank 23, when the beverage falls below brewing start electrode 95 the energizing circuit of relay 96 will be broken and the contacts associated therewith will again move to the position shown in Figure 9, contact 96a closing and contacts 96b and 96c opening. The closing of contact 96a completes the energization circuit for main water valve 18 permitting the flow of hot water from heating tank 10 to the next brewing receptacle. It will be recalled that at the termination of the previous brewing cycle the rotary distribution valve was operated to open the outlet port associated with the next brewing receptacle to be used. The brewing operation will proceed as previously described until the level of brewed beverage in measuring tank 23 reaches the bottom of brewing stop electrode 92 at which time relay 96 will again be energized, opening contact 96a to close main water valve 18, and closing contacts 96b and 96c.

If, during the brewing operation, a sufficient quantity of the beverage in dispensing tank 26 has been dispensed to uncover the lower end of electrode 94 so that the energizing circuit for relay 97 has been broken, the operation will proceed as previously described, relay 100 being energized to transfer the beverage from measuring tank 23 to dispensing tank 26, and distribution valve 40 being operated by distribution valve drive motor 42, under the control of its associated switches, to close the outlet port associated with the used brewing assembly and to open the outlet port associated with the brewing assembly to be next used. If the demand for beverage has not been great enough to empty dispensing tank 26 during the brewing cycle, the freshly brewed coffee will be retained in measuring tank 23 until this occurs, at which time the beverage will be transferred and the position of the distribution valve changed as previously described.

After the last of the brewing receptacles has been used, the initial operation of distribution valve motor 42, which occurs when relay 96 is energized at the end of the brewing operation and relay 97 is deenergized on substantial emptying of dispensing tank 26, will move raised portion 64a of cam 64 into engagement with the actuating arm 65a of switches 65 and 66 opening switches 65 and 66a while closing switch 66b. The opening of switch 65 breaks the energizing circuit for distribution valve motor 42 so that it will not move beyond the intermediate position when beverage enters dispensing tank 26. Thus, after all brewing receptacles have been used, all of the outlet ports of the distribution valve are left in the closed position. The beverage will be transferred to the dispensing tank and may be dispensed therefrom as previously described except that when the level of beverage drops below brewing start electrode 95 the resulting deenergization of relay 96 does not open water valve 18 as cam operated switch 62 is open. After substantially all of the beverage has been dispensed from tank 26, the energizing circuit of relay 97 will be broken as previously described and "Sold-Out" light 108 will be energized through contact 97a of relay 97 and contact 66b of switch 66. At the same time, the machine operating light 105 and the coin lock-out mechanism 106 will be deenergized as previously described, preventing further use of the machine.

If at any time during the operation of the machine the supply of cups 32 should be depleted, cup empty switch 99 will be moved from the position shown in Figure 9 opening contact 99a, deenergizing "Machine Operating" light 105 and coin lock out mechanism 106, while closing contact 99b, energizing "sold-out" light 108.

After a serviceman has removed the used, disposable brewing containers 70 and replaced them with similar containers of fresh ground coffee the machine may again be placed in operation by momentarily closing double-pole, single throw start switch 109. Section 109a of the start switch provides for the energization of relay 97 with the resultant closing of contact 97b associated therewith, while portion 109b of the switch is connected across switch 65 which, it will be recalled, was opened after the use of the last brewing receptacle through the operation of cam 64. A circuit is thus completed through contact 97b, of relay 97, contact 63b of switch 63 and contact 109b of switch 109 energizing distribution valve drive motor 42 which is allowed to turn until the outlet associated with the next brewing receptacle to be used is opened. Switch 109 may then be released and the apparatus will continue to function as previously described.

After one or more of the used brewing receptacles have been replaced, shut-off cam 64 should be reset so that it will not terminate operation of the apparatus until all of the brewing receptacles have been used. The cam is slidably and rotatably carried on distribution valve shaft 47 and is keyed thereto by the interengaging toothed portions 64b thereon which engage similar toothed portions 110a on sleeve 110. A bias spring 111 holds the cam 64 in engagement with sleeve 110. Cam 64 may be reset by lifting it to disengage the toothed keying portions and rotating it to the desired position.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a beverage brewing and dispensing apparatus having a plurality of beverage brewing receptacles and a source of liquid, means for controlling the preparation of the beverage, comprising: a liquid distribution valve having an inlet connected to said source of liquid, a plurality of outlets, one connected to each of said beverage preparing receptacles, and a control member for effecting communication between said inlet and the desired one of said outlets, an electric motor connected with said control member; a storage container for receiving brewed beverage from said receptacle; means for dispensing beverage from said storage container; means for measuring the quantity of beverage in said container; a brewing control circuit operable as a function of said measuring means to cause brewing of said beverage, and including a circuit for energizing said motor; a switch in said motor energizing circuit; a cam driven by said motor for operating said switch to break said motor circuit when said control member effects communication between the inlet and one of the outlets of said distribution valve; a second switch in said motor circuit; and a second cam driven by said motor to break said motor circuit when all of said receptacles have been used.

2. A control means of the character described in claim 1, including a manually operable switch connected in parallel with said second switch for restarting said motor after said used receptacles have been replaced.

3. In a beverage brewing and dispensing apparatus having beverage brewing means, a measuring tank to receive fresh beverage from said brewing means and a dispensing tank to receive brewed beverage from said measuring tank, a control system of the character described, comprising: means for measuring the quantity of beverage in said dispensing tank; means actuated by said measuring means causing operation of said brewing means when only a predetermined quantity of beverage remains in said dispensing tank to brew fresh beverage; means for measuring the quantity of beverage in said measuring tank; means actuated by the measuring means in the measuring tank for terminating operation of said brewing means when a predetermined quantity of beverage has been brewed; an electrically operated transfer valve between the measuring tank and the dispensing tank; a circuit responsive to the measuring means in said dispensing tank for opening said valve to transfer the brewed beverage from the measuring tank to the dispensing tank when only a second and lesser predetermined quantity of beverage remains in the dispensing tank.

4. A beverage brewing system of the character described, comprising: a source of a liquid ingredient of said beverage; a plurality of beverage brewing receptacles, each containing a quantity of an ingredient from which a beverage infusion may be prepared; a distribution valve for controlling the flow of said liquid to said receptacles and having a plurality of ports therein, one connected to said source of liquid and different ones connected to each of said beverage preparing receptacles, means normally closing the ports connected to said beverage preparing assemblies, and means, including a control member, for sequentially opening said closed ports, one at a time to permit the flow of said liquid to said brewing receptacles; means including a dispensing container for receiving and dispensing brewed beverage from said brewing receptacles; first means for measuring the quantity of beverage in said dispensing container; a motor for driving said control member; a circuit for energizing said motor and including a switch; means responsive to said first measuring means for actuating said switch; second measuring means for measuring the quantity of beverage in said dispensing container; and means controlled by said second measuring means for effecting a delivery of brewed beverage from said receptacles to said dispensing container only when a predetermined quantity of beverage remains therein, which predetermined quantity is less than that effecting actuation of said switch by said first measuring means.

5. In a beverage brewing and dispensing apparatus having beverage brewing means, a measuring tank to receive fresh beverage from said brewing means and a dispensing tank to receive brewed beverage from said measuring tank, a control system of the character described, comprising: first measuring means for measuring the quantity of beverage in said dispensing tank; means for brewing a quantity of fresh beverage; means for delivering fresh beverage from the brewing means to the measuring tank; second measuring means for measuring the quantity of beverage in said measuring tank; control means associated with each said measuring means and brewing means to effect a brewing operation thereof when the quantity of beverage in said dispensing tank falls below a predetermined level and discontinue the brewing operation when the quantity of freshly brewed beverage in the measuring tank reaches a predetermined level; third measuring means for measuring the quantity of beverage in said dispensing tank; means for delivering beverage from the measuring tank to the dispensing tank including a delivery control valve; control means associated with said third measuring means and said valve to effect delivery through said last named delivering means when the quantity of beverage in said dispensing tank falls below a predetermined level; and a timer for closing said valve after a predetermined time interval to preclude undesired delivery of beverage from said measuring tank to said dispensing tank.

References Cited in the file of this patent

UNITED STATES PATENTS

| | | |
|---|---|---|
| 213,815 | Etzensberger | Apr. 1, 1879 |
| 411,037 | Jones | Sept. 17, 1889 |
| 1,576,735 | Fessenden | Mar. 16, 1926 |
| 1,665,728 | Canright | Apr. 10, 1928 |
| 1,805,159 | Bauer et al. | May 12, 1931 |
| 1,822,433 | Brand | Sept. 8, 1931 |
| 1,971,382 | Petersen et al. | Aug. 28, 1934 |
| 2,012,194 | Hughes | Aug. 20, 1935 |
| 2,048,350 | McLean | July 21, 1936 |
| 2,340,070 | McCauley et al. | Jan. 25, 1944 |
| 2,420,589 | Dunnihoo | May 13, 1947 |
| 2,451,195 | Brown | Oct. 12, 1948 |
| 2,468,917 | Booth | May 3, 1949 |
| 2,488,817 | Kaminky | Nov. 22, 1949 |
| 2,539,771 | Chambers | Jan. 30, 1951 |
| 2,593,765 | Keefer | Apr. 22, 1952 |
| 2,656,927 | Prendergast | Oct. 27, 1953 |
| 2,761,200 | Arnett | Sept. 4, 1956 |

FOREIGN PATENTS

| | | |
|---|---|---|
| 548,160 | France | Oct. 13, 1922 |
| 576,628 | Great Britain | of 1946 |